United States Patent
Por

[11] 3,878,972
[45] Apr. 22, 1975

[54] LIQUID MEASURING AND DISPENSING APPARATUS

[76] Inventor: L. Laslo Por, P.O. Box 37, Christiansted, St. Croix, V.I. 00820

[22] Filed: Aug. 29, 1974

[21] Appl. No.: 501,731

[52] U.S. Cl. .............................................. 222/207
[51] Int. Cl. ............................................ B65d 37/00
[58] Field of Search ........ 222/213, 478, 481.5, 490, 222/188, 207, 211, 212, 213, 215, 481

[56] References Cited
UNITED STATES PATENTS
3,094,250  6/1963  Molyneaux .......................... 222/207
3,705,668  12/1972  Schwartzman ..................... 222/207

Primary Examiner—Stanley H. Tollberg
Assistant Examiner—Norman L. Stack, Jr.
Attorney, Agent, or Firm—A. Yates Dowell, Jr.

[57] ABSTRACT

An apparatus for measuring and dispensing liquids includes a flexible container which is squeezably operated to increase the pressure therein and thereby operate a fluid control valve mounted in a filler tube for discharging a quantity of fluid into a measuring receptacle mounted on the container, whereupon the decrease in pressure within the container caused by the discharge of fluid therefrom operates to open an air inlet valve allowing air to enter the container when the container is released.

7 Claims, 5 Drawing Figures

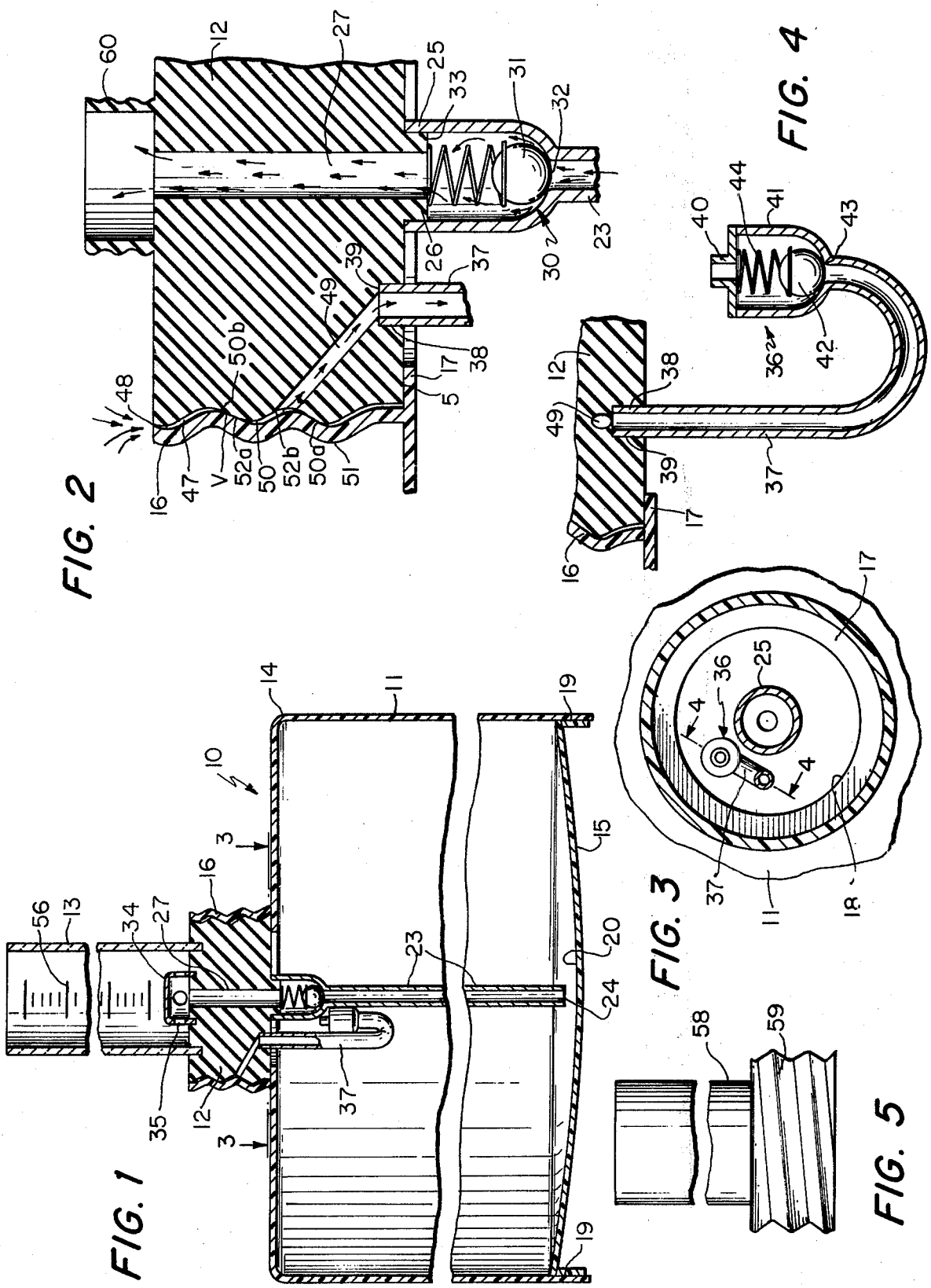

LIQUID MEASURING AND DISPENSING APPARATUS

BACKGROUND OF THE INVENTION

1. Field of the Invention

This invention relates generally to liquid dispensing apparatus and relates particularly to a flexible liquid dispensing apparatus which is squeezably operated to discharge varying amounts of fluid to a measuring receptacle mounted thereon.

2. Description of the Prior Art

Heretofore much effort has been extended to the development of a variety of squeezable liquid dispensers for use in the dispensing of a variety of fluids ranging from detergents to medicines. Due to the fact that many fluids are used in optimum amounts or prescribed dosages, many dispensers have been provided with measuring vials or receptacles which are either integrally formed with the lid or stopper of the container or removably mounted thereon.

In the operation of a typical or standard squeeze bottle, as the container walls are collapsed the increased internal pressure causes liquid to be discharged through a nozzle or valve. After a desired amount of liquid is discharged, the container walls are released and permitted to resume the original configuration as air rushes back through the same nozzle or valve and re-establishes or balances the pressure within the container with that of the surrounding environment.

However, when discharging from a container into a measuring or other receptacle which is mounted in line with and beyond the nozzle or valve, a separate air inlet valve must be provided in order that all the liquid dispensed into the receptacle remains therein as the pressure differential between the container and the receptacle is equalized.

Various disadvantages are found in prior art liquid dispensing and measuring devices. Often air inlet valves are located in the exterior portion of the container or the container lid or cap and are therefore directly exposed to dust, dirt and other contaminants which may be in the air or spilled or otherwise deposited on the container. It is also important that both the container closure and air inlet valve be fluid tight so that liquid being dispensed is insured of being discharged only through the appropriate liquid discharge valve.

Examples of the prior art include U.S. patents to Schwartzman N. 3,705,668; Ward No. 2,761,833; Hall, et al No. 2,808,966; Mueller No. 3,656,660; and Molyneaux, et al No. 3,094,250.

SUMMARY OF THE INVENTION

The present invention is embodied in a squeeze bottle type liquid dispensing and measuring apparatus in which the flexible container includes a neck having a flanged lower portion for providing a liquid and airtight seal against a stopper or closure member which is loosely threadedly received thereby and which further includes a pressure operated fluid outlet valve located along a liquid fill tube which extends from a point adjacent the lowermost portion of the container through the closure member and into a measuring receptacle which is mounted on the stopper or closure member. The apparatus further includes an air inlet valve disposed within the container which is opened to the atmosphere by a tortuous path air inlet passage which extends through the closure member and threadedly engaged portions of the container neck and closure member.

It is the object of this invention to provide a squeezable fluid dispensing and measuring apparatus having an interiorly located air inlet portion having a tortuous path air inlet passage opening to the surrounding atmosphere in order to reduce the possible intake of dust, dirt and other contaminants into the container.

It is a further object of this invention to provide a squeezable fluid dispensing and measuring apparatus which includes a flanged sealing member disposed adjacent the lower portion of the neck of a dispensing container to prevent the loss or discharge of any fluid except through the appropriate fill tube or fluid outlet valve.

BRIEF DESCRIPTION OF THE DRAWINGS

FIG. 1 is a cross-section taken through a central vertical plane of the apparatus.

FIG. 2 is an enlarged fragmentary section of the air inlet passageway through the threadedly engaging portions of the apparatus.

FIG. 3 is a section taken along the line 3—3 of FIG. 1.

FIG. 4 is a section taken along the line 4—4 of FIG. 3.

FIG. 5 is a side elevation of a detachable cap member.

DESCRIPTION OF THE PREFERRED EMBODIMENT

With continued reference to the drawings, a liquid dispensing and measuring apparatus 10 is shown including a squeezable container 11 and valve carrying closure member 12 having a liquid measuring or dispensing receptacle 13 mounted thereon. The container 11 is constructed of a suitable flexible material which may be selected from synthetic organic elastomeric thermoplastic material, rubber, or the like and includes top and side walls 14, a bottom wall 15, a neck 16, and a flanged sealing portion 17 extending inwardly of the neck and defining the perimeter of an opening 18 into the container.

The closure member 12 is preferably constructed of rubber, although various thermoplastic materials could be effectively utilized. The liquid measuring receptacle is preferably constructed of transparent or translucent rigid or semi-rigid thermoplastics; however, glasswares may be used as desired.

As shown in FIG. 1, the bottom of the container is preferably tapered downwardly from the junction 19 thereof with the side walls 14 to a sump or central reservoir area 20. Disposed within the container and extending downwardly therethrough is a filler or dip tube 23. The intake 24 of the filler tube is positioned so as to be adjacent the reservoir area 20. The upper end or outlet end 25 of the filler tube is flared outwardly and is frictionally engaged with or otherwise mounted to the closure member 12 by means of an integrally formed downwardly extending flanged portion 26 on the closure member and is thereby aligned with a fluid passageway 27 disposed centrally of and through the closure member 12.

With reference to FIGS. 1 and 2, the outwardly flared upper end portion 25 of the filler tube defines the housing of a fluid control valve 30. Control valve 30 includes a ball valve 31 which is normally urged against the lower portion of the outwardly flared end portion or valve seat 32 by a spring 33 although the ball valve could be simply closed by the force of gravity. The opposite end of the spring 33 bears against the downwardly flanged portion 26 of the closure member.

Carried by or mounted on the upper surface of the closure member 12 is a liquid flow deflecting member 34 to prevent spurting. The flow diverging member is positioned directly above and coaxially with the outlet of the closure member's fluid passageway 27. A plurality of outlets or holes 35 are provided through the side of the flow diverging member so that the fluid flow into the measuring receptacle 13 from the container is outwardly and not upwardly as indicated by the arrows in FIG. 2.

In order to allow the pressure within the container to be equalized with the atmospheric pressure after an amount of liquid has been forced therefrom, an air inlet valve assembly 36 is provided within the container. With reference to FIGS. 2 and 4, the air inlet valve assembly includes a generally U-shaped air inlet tube 37 having one end 38 mounted within a recess 39 in the lower portion of the closure member 12. Adjacent the other end or outlet end 40 of the tube 37 is an enlarged outwardly flared portion which defines a housing 41 for a ball valve 42. The ball valve 41 is noramlly urged toward a valve seat 43 by a spring 44 carried between the end portion or outlet 40 and the ball valve 42 and thereby closes off the air inlet tube 37. In certain instances, it may be that the spring 44 can be elevated and the ball valve urged closed by gravity.

The air inlet valve assembly is disposed within the container 11 to reduce the possibility of improper seating or clogging of the ball valve by dust, dirt, or other foreign material. In order to reduce the possibility of contaminating the liquid content of the container by dust and other foreign material which may be introduced with the air supply, a tortuous air passageway 47 is provided.

The air inlet passageway 47 is shown in detail in FIG. 2 as being created by loosely screw-threaded engagement of the neck 16 and closure member 12 and connects an air inlet 48 with at least one air passage bore 49 which extends from the side of the closure member 12 therethrough to the recess 39 and thereby connects the tortuous path air passageway with the air inlet valve assembly. The neck 16 of the container 11 is provided with inner and outer screw-threaded portions 50 and 51, respectively. The closure member is constructed having screw-threaded side portions 52 which are received by the inner screw threads 50 of the neck 16 of the container. This screw-threaded engagement, however, is loose and therefore is not airtight.

In order that there be an air and liquid tight seal between the container and the outside atmosphere, the closure member 12 is rotated relative to the neck of the container until the outer periphery of the bottom thereof is firmly seated against the flanged sealing portion 17 of the container, as shown at S. When the closure member is thus firmly seated, it will be apparent, as shown at V in FIG. 2, that the upper surfaces 52a of the screw-threaded portions 52 will be forced upwardly against the lower surfaces 50b of the corresponding inner screw-threaded portion of the neck.

Therefore, air entering through the passageway 47 normally follows a spiral path from an inlet 48 downwardly around the engaged threads of the closure member and neck. Due to the particular engagement maintained between the threads of the neck and closure member, the inlet to the air passage bore 49 is situated along a lower surface 52b of the screw-threaded portions 52.

Although the connection of the closure member with the container has been described as being a loose screw-threaded engagement, it is contemplated that either the neck portion or closure member could be provided with a series of generally vertically extending ribs or radially spaced projections which would allow a frictional engagement between the members while simultaneously providing a series of air passages therebetween which cooperate with the air passage bore 49 and the air inlet 48.

As previously discussed, the apparatus includes a measuring or other liquid retaining receptacle 13. As shown in FIG. 1, the receptacle may include a series of calibration marks 56 which indicate the exact amount of fluid discharged and retained above the ball valve 31.

It is further contemplated that the respective surface forming the area of contact indicated at S, which forms the seal between the closure member and the container, may be roughened, etched or otherwise prepared to form a more effective seal therebetween.

With reference to FIG. 5, the apparatus is provided with a removable cap 58 which is secured over the measuring receptacle 13 by a threaded engagement between the threaded base portion 59 of the cap and the outer screw-threaded portion 51 of the neck.

A modified embodiment of this invention is shown in FIG. 2 as replacing the measuring receptacle 13 of FIG. 1 and flow defecting member 34 with a discharge spout or outlet 60. The spout 60 extends upwardly from the top of the closure member and is axially aligned with the fluid passageway 27. This modification allows the apparatus to be used for dispensing high viscosity liquids or semi-liquids as there is no obstruction by the diverging member to the flow of the fluid from the liquid passageway. A cap, not shown, may also be provided to threadedly engage and form an airtight seal with the outer screw-threaded portions of the spout.

In use of the preferred embodiment, the container may be filled with any of a multiplicity of fluids, such as medicines, washes, cleaning agents, and food products. The closure member having the air inlet tube 37 and filler tube 23 connected thereto and the measuring receptacle mounted thereon is subsequently threaded or inserted within the neck 16 and brought into an airtight sealed engagement with the flanged sealing portion 17 which extends inwardly of the container neck.

When it is desired to dispense a specific or desired quantity of liquid, the container is squeezed causing the pressure therein to increase, thereby opening ball valve 31 and compressing spring 33. Fluid being discharged through the filler tube 23 is directed outwardly into the receptacle 13 by the flow diverging cap 34 and accidental discharge or spraying of liquid over or out of the container is thereby prevented.

Once the desired amount of liquid has been discharged beyond the ball valve 31, as indicated by the calibration marks on the receptacle, the container is released from the pressurized grasp of the user and the spring 33 forces the ball valve 31 closed against valve seat 32. The decreased pressure within the container simultaneously allows the atmospheric air pressure to force the air inlet assembly ball valve 42 to open against spring 44 and air, which enters the air inlet 48 and travels the tortuous path 47 between the neck and closure member and flows into the air inlet assembly via the air passage bore 49, is allowed to enter the container until such time as the pressure within the container is sufficient to allow spring 44 to close ball valve 42 against valve seat 43.

As the fluid level within the container decreases, the cooperation between the central reservoir area 19 and the filler tube 23 allows substantially all the liquid to be dispensed from the container.

I claim:

1. An apparatus for dispensing fluids comprising a flexible container having an upwardly extending neck with inner and outer surfaces, a radial inwardly extending flange located adjacent to the lower portion of said neck and defining an opening into said container, a closure member having upper and lower surfaces and removably engaging said inner surface of said neck while defining an air passageway therebetween, the lower surface of said closure member being in sealing engagement with said flange, a pressure responsive dispensing means carried by said closure member for controlling the discharge of fluids from said container when the pressure within the container is increased, a pressure responsive air inlet means mounted on said closure member for admitting air into said container when the pressure therein is less than atmospheric, said closure member having an air passage bore providing communication between said air inlet means and the air passageway, whereby atmospheric air entering said container follows a tortuous path through the air passageway and the opening in said closure member and said air inlet means into said container.

2. The structure of claim 1 including a fluid receptacle mounted on the upper surface of said closure member for receiving fluid dispensed from said container.

3. The structure of claim 2 in which said pressure responsive dispensing means for controlling the discharge of fluid from said container into said receptacle includes a filler tube carried by said closure member and having an inlet disposed within said container, a pressure responsive fluid control valve means located within said filler tube, said closure member having a fluid passageway therethrough connecting said filler tube with said fluid receptacle, and flow defecting means mounted on said upper surface of said closure member in alignment with the fluid passageway so that fluid passing therethrough will be forced outwardly into said fluid receptacle without spurting.

4. The structure of claim 3 in which said fluid control valve means includes a ball valve normally urged against a valve seat by spring means to prevent the passage of fluid through said filler tube, and said ball valve being moved away from said valve seat while compressing said spring means when the pressure within said container is increased.

5. The structure of claim 3 in which said container includes a bottom wall having a sump portion formed therein, and said inlet of said filler tube is adjacent said sump whereby substantially all the fluid within said container is dispensed therefrom.

6. The structure of claim 1 in which said pressure responsive air inlet means includes an air inlet tube connected to said closure member and extending into said container, valve means disposed within said air inlet tube, said valve means including a valve seat and a ball valve normally urged against said valve seat by a spring means, whereby the decrease of pressure within said container causes said ball valve to be opened against said spring means until the pressure within the container is substantially atmospheric.

7. An apparatus for measuring and dispensing fluids comprising a flexible container having an upwardly extending neck with inner and outer screw-threaded surfaces, a radial inwardly extending flange located adjacent to the lower portion of said neck and defining an opening into said container, and a bottom wall having a sump portion formed therein, a closure member having upper and lower surfaces and being in threaded engagement with said inner screw-threaded surface of said neck while defining an air passageway therebetween, the lower surface of said closure member being in sealing engagement with said flange, a fluid receptacle mounted on the upper surface of said closure member, a pressure responsive dispensing means carried by said closure member for controlling the discharge of fluids from said container into said receptacle when the pressure within the container is increased, said pressure responsive dispensing means including a filler tube carried by said closure member and having and inlet disposed adjacent said sump portion of said container, a pressure responsive fluid control valve means carried by said filler tube, said closure member having a fluid passageway therethrough connecting said filler tube with said fluid receptacle, and flow deflecting means mounted on said closure member in alignment with the fluid passageway so that fluid passing therethrough flows outwardly into said fluid receptacle, without spurting a pressure responsive air inlet means mounted on said closure member for admitting air into said container when the pressure therein is less than atmospheric, said air inlet means including valve means carried by an air inlet tube mounted on said closure member and disposed within said container, said closure member having an air passage bore providing communication between said air inlet means and the air passageway, whereby atmospheric air entering said container follows a tortuous path through the air passageway and the bore in said closure member and said air inlet means into said container.

* * * * *

UNITED STATES PATENT OFFICE
CERTIFICATE OF CORRECTION

PATENT NO. : 3,878,972
DATED : April 22, 1975
INVENTOR(S) : L. Laslo Por

It is certified that error appears in the above-identified patent and that said Letters Patent are hereby corrected as shown below:

Column 5, line 47, "defecting" should be -- deflecting --

Signed and Sealed this

Ninth Day of November 1976

[SEAL]

Attest:

RUTH C. MASON
Attesting Officer

C. MARSHALL DANN
Commissioner of Patents and Trademarks